July 9, 1968
T. A. ARMAO
3,391,690
BIOPSY INSTRUMENT INCLUDING TISSUE HEATING
OR COOLING MEANS AND METHOD OF USE
Filed April 5, 1965
3 Sheets-Sheet 1
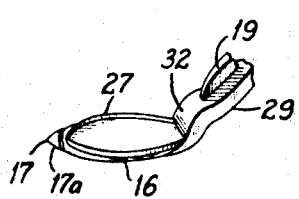
Fig. 7a.
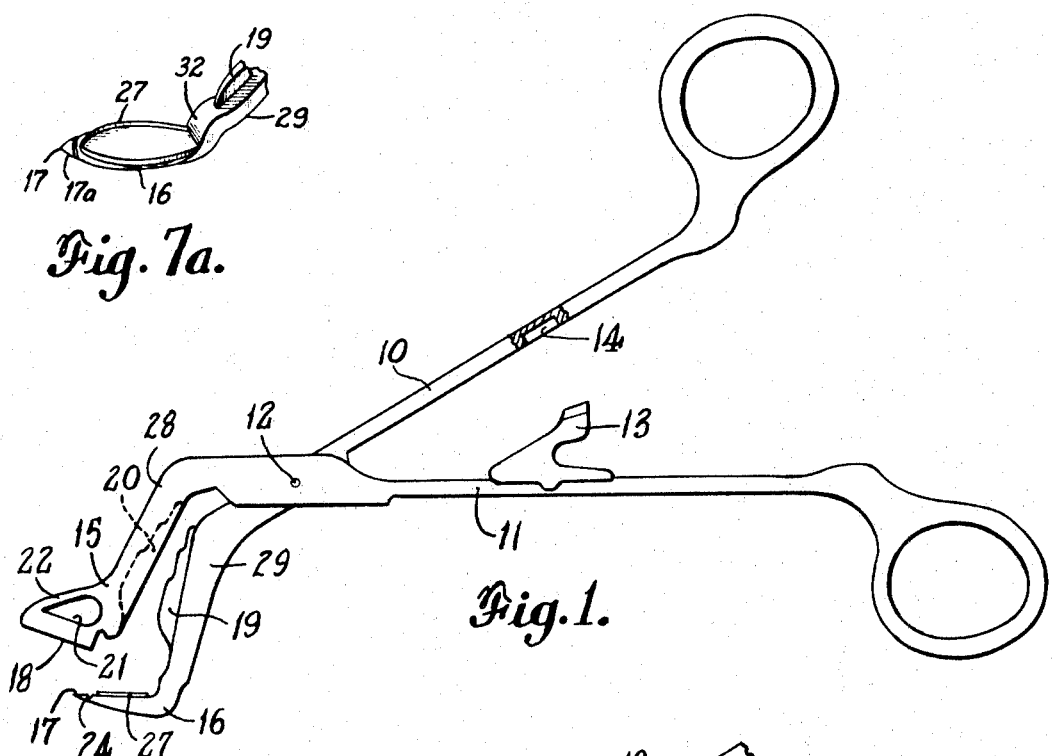
Fig. 1.
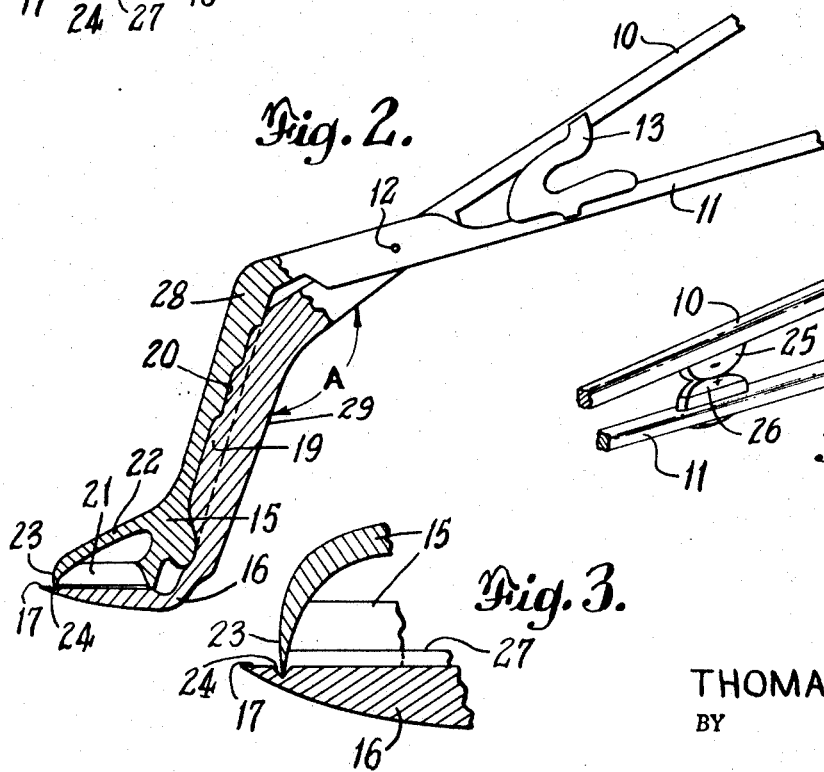
Fig. 2.
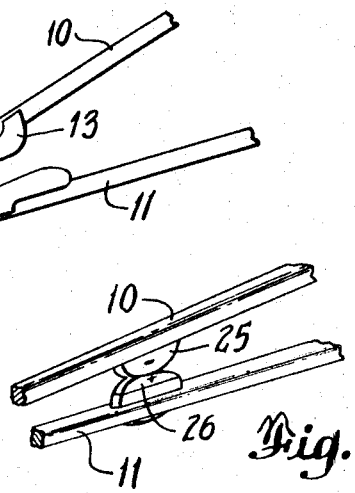
Fig. 4.
Fig. 3.
INVENTOR.
THOMAS A. ARMAO
BY
ATTORNEY
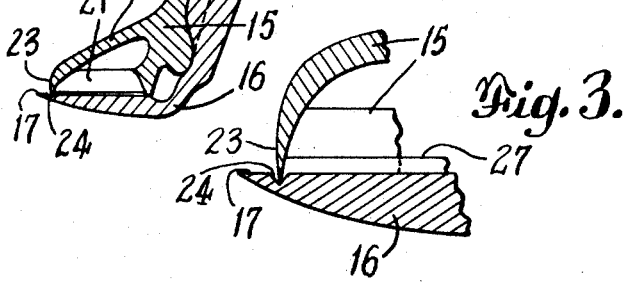

July 9, 1968 T. A. ARMAO 3,391,690
BIOPSY INSTRUMENT INCLUDING TISSUE HEATING
OR COOLING MEANS AND METHOD OF USE
Filed April 5, 1965 3 Sheets-Sheet 2
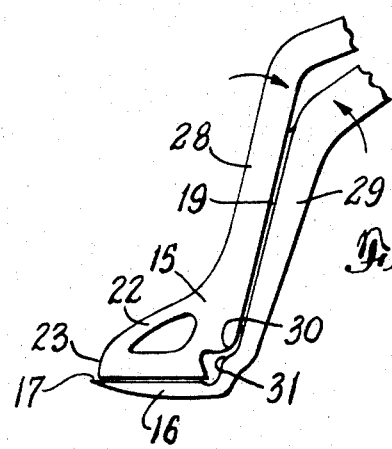
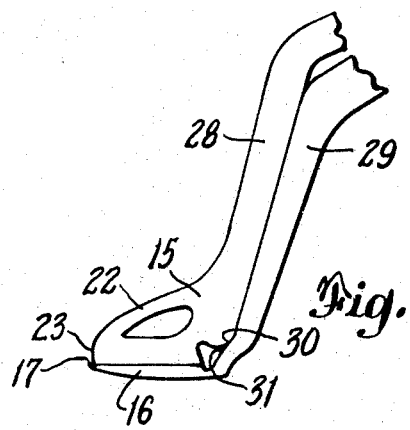
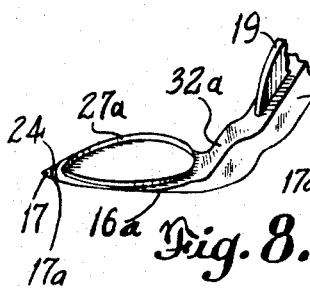
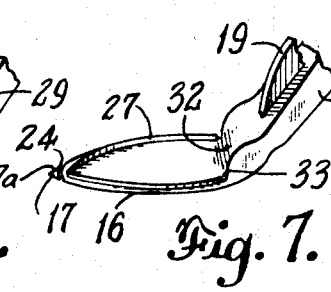
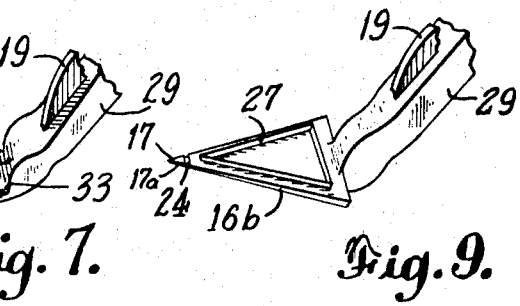
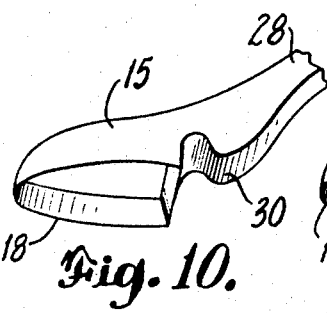
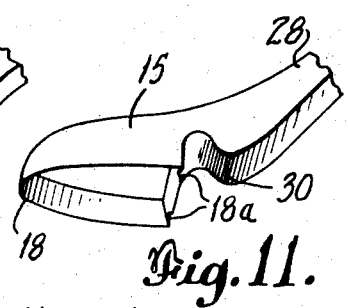
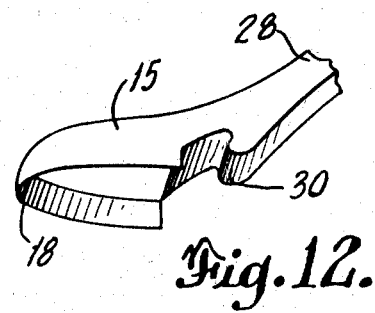
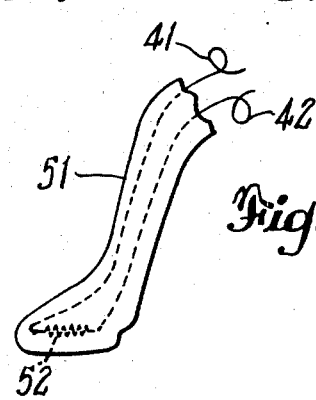
INVENTOR.
THOMAS A. ARMAO
BY
ATTORNEY July 9, 1968 T. A. ARMAO 3,391,690
BIOPSY INSTRUMENT INCLUDING TISSUE HEATING
OR COOLING MEANS AND METHOD OF USE
Filed April 5, 1965 3 Sheets-Sheet 3
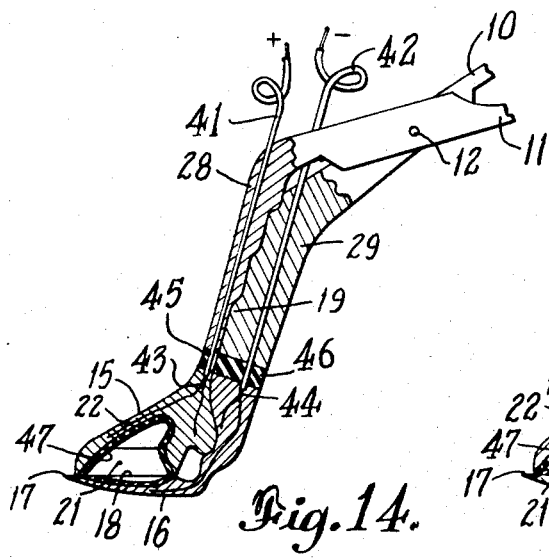
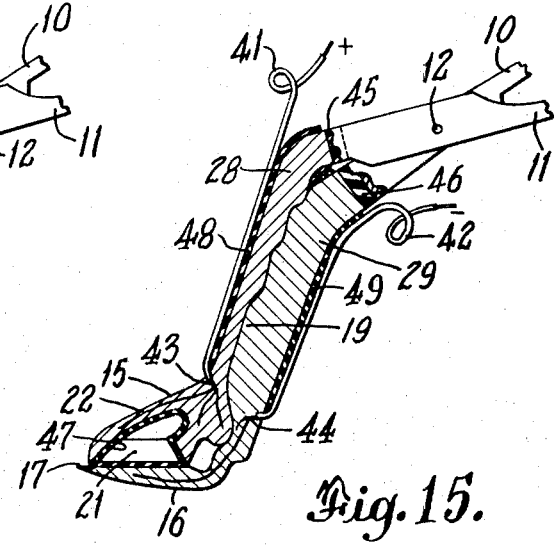
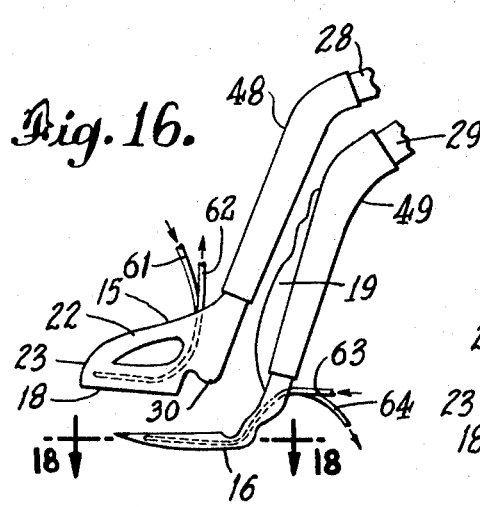
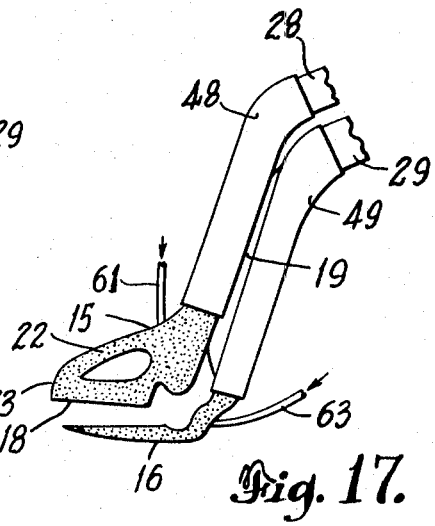
INVENTOR.
THOMAS A. ARMAO
BY
ATTORNEY

United States Patent Office 3,391,690
Patented July 9, 1968

3,391,690
BIOPSY INSTRUMENT INCLUDING TISSUE HEATING OR COOLING MEANS AND METHOD OF USE
Thomas Anthony Armao, 1242 56th St., Brooklyn, N.Y. 11219
Continuation-in-part of application Ser. No. 134,733, Aug. 29, 1961. This application Apr. 5, 1965, Ser. No. 447,604
26 Claims. (Cl. 128—2)

This application is a continuation-in-part of Ser. No. 134,733, filed Aug. 29, 1961, now abandoned.

The present invention relates to surgical instruments. More particularly it relates to instruments useful for removing specimens of tissues from human and animal bodies so that the specimen may be examined in a laboratory.

Instruments heretofore available, such as described in U.S. Patent 2,778,357, are useful for punching out a specimen of tissue from a sheet or flap of tissue or from soft spongy tissue where a fold of tissue can be grasped with the opposing cutter from either side. Such instruments cannot ordinarily be used alone, however, when the tissue is to be removed from a relatively smooth surface, such as is found inside the mouth or on the outer skin. Conventional biopsy punches are also quite difficult to use inside any body cavity, such as the vaginal tract or uterus, where visibility is limited.

Modern diagnostic techniques nearly always require a biopsy for diagnosis of a malignancy. This is particularly true when cancer of the cervix is suspected.

In such cases especially it is important that hemotasis be achieved in the area where the specimen is removed. The lymphatics and the vascular system must be sealed, as by cauterization, against the spread of the malignancy or else stasis of the area must be achieved and the tissue bed subsequently sealed or cauterized. There is great need therefore for a simple and reliable method and instrument for removing biopsy specimens and for preventing metastizing in the tissue from which the specimen is removed.

Because of the difficulty of using presently available punches, the most satisfactory method of obtaining tissue specimens for biopsy from certain areas, for example the inside of the both, is by use of a scalpel and scissors to slit and dissect away a flap of tissue. This technique is described in the article "Biopsy Procedures" by B. E. D. Cooke at pp. 750–755 of volume 2, Number 7 (July 1958) of "Oral Surgery, Oral Medicine and Oral Pathology." This technique requires a great deal of skill on the part of the person using it and nearly always involves some tearing and laceration of the tissue surrounding that being removed.

In all present methods of removing tissue, whether with a scalpel or presently available special instruments, the principal danger and disadvantage is the trauma or damage done to surrounding tissue and the possible metastizing or release of malignant cells into healthy tissue and the blood streams if the tissue is malignant, thereby spreading the malignancy. This danger can be minimized or eliminated only by stasis, followed by sealing off the tissue surrounding the specimen removed, either immediately after or simultaneously with the removal of the specimen.

An object of the present invention is to provide an instrument which will permit the removal of a specimen from a wall of tissue with minimum disturbance to the surrounding tissue.

Another object of the invention is to provide an instrument for entering tissue and removing a specimen or portion of the tissue, which specimen or portion will retain the cellular morphology of the tissue from which it is removed, while at the same time sealing off the thus exposed surface of the tissue from which the specimen or portion has been removed.

A further object of the invention is to provide an instrument which will, simultaneously with the removal of a specimen tissue, seal off the surrounding tissue and prevent metastizing or spread of any maligancy present.

A still further object of the invention is to provide an instrument which will completely remove small lesions, for example, polyps or warts.

Yet another object of the invention is to provide an instrument for the removal of tissue specimens which permits the operator maximum control of the cutting action of the instrument.

Another object of the invention is to provide an instrument with surgical tissue contacting or cutting members of heat conductive material and a hollow through at least one of the members through which a cryogenic fluid can be circulated for cooling the instrument.

Still another object of the invention is to provide a method of simultaneously cutting and causing stasis or cauterization of soft viable tissue by cooling it to a temperature of from 0 to −14° C. for stasis and below −15° C. for cauterization.

Still another object of the invention is to provide a method of causing stasis of viable tissue by rapidly cooling to a temperature of between 0° C. and −14° C. by means of applying a surgical instrument to the tissues.

Still another object of the invention is to cause cauterization of the viable tissue by applying a surgical instrument to the tissue and cooling the tissue rapidly to a temperature below −15° C.

Still other objects of the invention will be apparent from the description which follows.

The instrument of the invention is of the biopsy punch type but is quite different from a conventional biopsy punch in that the lower member is relatively thin and has a forward lateral cutting edge which is inserted directly into the tissue. The upper member has a relatively vertical cutting edge which, when the instrument is closed, cooperates with the lower member to punch out a specimen of tissue. When the instrument is closed the upper member first moves directly down on the lower member and then, when the two members barely meet, further closing pressure causes the upper member to move laterally forward a very short distance and then slightly downward, thereby assuring a complete cutting of the specimen from the surrounding tissue. One of the members, above the hinge point of the instrument, may have a short extending strut or fulcrum which meets the upper handle when the instrument is nearly closed, thereby providing a fulcrum for more accurate control of the final closing motion. Magnets may also be attached to each of the handles to provide assistance in closing the instrument and to hold it closed after the specimen is enclosed. One of the magnets may be reversed to provide a repulsion which is useful in some uses of the instrument, as will be seen.

In a preferred embodiment of the invention, one or both cutting members can be fitted with interior conduits to permit introducing a cooling fluid, thereby cooling the outer surfaces sufficiently to cause stasis, or cauterization of tissue around the specimen being removed and thereby decrease or eliminate metastizing spreading or seeding of the malignancy into the host or patient. The cutting member may also be porous so that the cooling fluid is diffused, through the member to achieve the cooling and attendant stasis. Preferably in this embodiment, the interior surfaces of the cutting members which contact the specimen being removed are lined with an insulating material to prevent damage to the specimen and maintain its cellular morphology.

The methods by which the objects of the invention are carried out comprise simultaneously cutting soft viable tissue and causing either stasis or cauterization thereof by passing a cryogenic fluid through a hollow in the surgical cutting instrument and cooling the tissue to a temperature of from about 0° C. to −14° C. for stasis and to a temperature below −15° C. for cauterization.

In the drawings

FIGURE 1 is a side elevation of an embodiment of the invention in the open position.

FIGURE 2 is a partial cross section of an elevation of an instrument of the invention in the closed position, with detail of the upper handles omitted.

FIGURE 3 is an enlarged cross section of the tips of the cutting members in the closed position.

FIGURE 4 illustrates the magnets which may be included in the upper handles.

FIGURE 5 is a side elevation of the cutting members when they have been brought together to barely touch.

FIGURE 6 is a side elevation of the cutting members when they have been brought together tightly and the upper member has slid forward slightly.

FIGURES 7 and 7a illustrate the lower cutting member with a raised lower cutting edge which extends around the two sides and front of the lower cutting member but not the back thereof.

FIGURE 8 illustrates the lower cutting member with raised lower cutting edge extending around the lower member in a generally elliptical curve.

FIGURE 9 illustrates the lower cutting member with a raised lower cutting edge extending entirely around the lower cutting member in a triangular pattern.

FIGURE 10 illustrates the upper cutting member which cooperates with lower cutting member illustrated in FIGURE 7.

FIGURE 11 illustrates an upper cutting member with notches which cooperate with a lower cutting member like that illustrated in FIGURE 7 except that it has no gap between the vertical cutting edge and rear wall.

FIGURE 12 illustrates an upper cutting member without a rear section to its upper cutting edge and which cooperates with a lower cutting member like that illustrated in FIGURE 7 except that it has no gap between the vertical cutting edge and rear wall.

FIGURE 13 illustrates a non-cutting heated tool for separate cauterizing.

FIGURE 14 illustrates an embodiment of the invention including means for heating the lower ends of the cutting members.

FIGURE 15 illustrates an embodiment of the invention including means for heating cutting members with insulation to protect the outer surfaces of the upper parts of the cutting members.

FIGURE 16 illustrates an embodiment of the invention wherein conduits are included in the cutting members to permit passing cooling fluid through them.

FIGURE 17 illustrates an embodiment of the invention wherein the cutting members are made of porous material with conduits for diffusing cooling fluid through the cutting members.

FIGURE 18 is a cross section through the lower cutting member shown in FIGURE 16.

In an instrument according to the invention, a pair of elongated elements 10 and 11 are connected to each other by a hinge 12. An optional fulcrum 13 on member 11 cooperates with the opposing member 10, preferably through a notch 14 when the instrument is nearly closed, thereby giving better control of the cutting action. The fulcrum 13 is preferably somewhat flexible. An upper cutting member 15 cooperates with a lower cutting member 16 to punch out a tissue specimen when the members are brought together. A guide fin 19 assures the proper meeting of the cutting members 15 and 16 by entering the guide fin opening 20 shaped to receive it. A pointed tip 17 on the end of the lower cutting member 16 has lateral cutting edges 17a along the rearwardly extending side edges thereof and permits easy entry of the member 16 into tissue. After pointed tip 17 with the lateral cutting edges 17a has been inserted into the tissue and the member 16 is thrust fully into the tissue and under the area from which a specimen is desired the instrument is closed and the upper cutting edge 18 cuts or punches out the specimen. When the instrument is in the closed position as shown in FIGURE 2 the specimen is trapped in the specimen cavity 21 defined by the interior of the upper cutting member 15 and the top of the lower cutting member 16. The upper cutting member 15 can have a reinforcing strut 22 which will also serve to prevent the specimen from falling out when the instrument is tilted. This strut 22 is not essential and when it is not present one or more wires across the top of the specimen cavity 21 will serve to restrain the specimen. The top of the specimen cavity 21 is preferably open so as to readily accommodate the specimen cavity 21 without distortion, bruising or squeezing of specimen. Preferably also the opening at the top of the specimen cavity 21 is somewhat smaller than the opening at the bottom formed by the upper cutting edge 18 so that the specimen is not likely to come out the top of cavity 21.

Preferably the forward cutting end 23 of the upper cutting edge 18 extends downward slightly beyond the edge 18 and when the instrument is closed this extended forward cutting end 23 is accommodated with contact by a groove 24 in the lower cutting member 16, so that the sharpness of the forward cutting end 23 is preserved. If desired, magnets 25 and 26 can be affixed in the members 10 and 11. One of the magnets 26 can be revolved to reverse the poles so that the magnets can either attract or repel. If desired, the lower cutting member 16 may have a raised lower cutting edge 27 which cooperates with the cutting edge 18 of the upper cutting member 15 to punch out the tissue specimen.

As can be seen from FIGURE 5, when the instrument is closed to the extent that the upper cutting edge 18 just meets the lower cutting member 16, the forward element portions 28 and 29 are slightly separated and the tip 17 extends slightly beyond the front of the upper cutting edge 18. Further pressure bringing together the elongated elements 10 and 11 causes upper forward element 28 to move tight against the lower forward element 29. At the same time the upper cutting member moves forward slightly with respect to the lower cutting element 15 with the result that with full pressure applied the front end of the upper cutting edge 18 abuts the tip 17. This slight forward motion, which accomplishes a better cutting away of the tissue specimen, is caused by the heel 30 of the upper cutting member 16 moving over the hump 31 in the lower cutting member.

The lower cutting member 16 illustrated in FIGURE 7 and other figures has a top surface which is generally elliptical in shape, with the tip 17 which is pointed and which has the lateral cutting edges 17a thereon. The raised lower cutting edge 27 can be generally elliptical in shape and is interrupted by a rear wall 32 of the lower cutting member 16, as shown in FIGURE 7. The upper cutting edge 18 as shown in FIGURE 10 can be circumferentially complete and the upper cutting member 15 so designed that as the instrument is closed the rear portion of the cutting edge 18 slides down and cooperates with the rear wall 32 to punch out the specimen completely. A slight gap 33 between the lower cutting edge 27 and the rear wall 32 accommodates the rear portion of the cutting edge 18 when the instrument is completely closed.

In a different embodiment of the invention the gap 33 is omitted and the lower cutting edges 27 abut the rear wall 32, as shown in FIGURE 7a. The rear portion of the cutting edge 18 has two notches 18a which fit over the lower cutting edges 27 and permit the upper cutting member 15 to slide forward during the cutting action, as shown in FIGURE 11.

In another embodiment of the instrument the gap 33 is omitted, and the lower cutting edges 27 abut the rear wall 32, as shown in FIGURE 7a. The upper cutting edge 18 is interrupted in the rear portion as shown in FIGURE 12 and the punch-cutting action of the instrument is confined to the front and sides. This embodiment is particularly useful where the edge of the flap of tissue from which the specimen is to be removed is clearly defined.

In yet another embodiment of the invention both the lower cutting edge 27a, as shown in FIGURE 8, and the upper cutting edge 18 are circumferentially complete and the tissue specimen is punched out completely by both edges. In the embodiment the rear wall 32a of the lower cutting member 16a is moved back to clear the rear of the upper cutting edge 18.

The opposing cutting members need not be generally elliptical in shape, as illustrated in most of the drawings, but can be any shape which will serve to remove the tissue. A triangular shape for a lower cutting member 16b is shown in FIGURE 9. It is also to be understood that the lower cutting edge 27 is not essential and can be omitted. In this embodiment the top surface of the lower cutting member 16 is substantially flat, but may have a groove to receive the upper cutting edge 18, which does all the cutting.

The instrument has been illustrated with each elongated element 10 and 11 having the respective forward element 28 or 29 bent at an angle of about 45° from the remainder of the elongated element 10 or 11. When bent at such an angle the instrument is particularly adapted to use in areas such as the mouth, where the bend aids in causing penetration with the lateral cutting edges 17a on the tip 17. For use in some areas, however, for example the uterus, it may be desirable to have the angle of bend greatly reduced or even eliminated, and such shapes are entirely within the scope of the invention. It should also be noted that the instrument can be used as an ordinary biopsy punch without penetrating with the tip 17 of the lower cutting member 16.

While the instrument described above is complete and useful in the form shown, preferred embodiments include means for causing stasis in or cauterizing the remaining tissue bed from which the specimen has been removed to prevent the spread of any malignancy present. The instrument shown in FIGURE 14 is equipped with electrical means to permit heating the instrument to cause cauterization and sealing of the tissue. Wires 41 and 42 bring electrical current into the cutting members 15 and 16 which resist the flow of current and thereby heat up. The flow of current can be controlled entirely by a remote switch or the instrument itself can serve, or a switch with current flowing immediately when the instrument is closed, thereby causing metal-to-metal contact between the cutting member 15 and 16 and closing the electrical circuit so as to permit current to flow. The wires which extend down inside the upper and lower forward elements 28 and 29 are insulated along their length except for the terminal portions 43 and 44 which are in the cutting members 15 and 16. Electrical insulating blocks 45 and 46 interrupt the entire cross sections of forward elements 28 and 29 just above the terminal portions 43 and 44 of the wires 41 and 42. These insulating blocks confine the current and resulting heat to the cutting members 15 and 16. Preferably a thermally insulating lining 47, of ceramic or any other suitable material, lines the walls of the specimen cavity 21 to protect the specimen from the heat.

In the embodiment of the heated instrument shown in FIGURE 15 the electrical insulating blocks 45 and 46 are placed higher up in forward elements 28 and 29 or even above the hinge 12 if the hinge itself is insulated. The wires 41 and 42 run down the outside of the forward elements 28 and 29, with the terminal portions 43 and 44 inserted into the cutting members 15 and 16. In this embodiment the forward elements 28 and 29 become hot and tissue is protected from burning by thermal insulating sleeves 48 and 49 which cover the outer surfaces of the elements. These sleeves may be of any suitable thermal insulating material, for example, ceramic.

The heated tools described above are all cutting tools and the cauterizing is accomplished by the same instrument that removes the specimen. If desired, however, cauterizing can be accomplished with a separate non-cutting tool. This separate tool 51 is illustrated in FIGURE 13. Preferably it is heated electrically through wires 41 and 42, connected to an internal heating element 52 with the circuit completed through an exterior switch not shown. The tool 51 is the same size and exterior shape as the cutting instrument. In use, after a tissue specimen is removed by the cutting instrument, the heating tool 51 is immediately placed in the cavity from which the specimen is removed. Current is then applied to cauterize the tissue around the cavity.

An embodiment of the instrument wherein stasis is achieved by cooling the cutting members 15 and 16 is shown in FIGURE 16. A conduit 61 admits cooling fluid into the upper cutting member 15. The fluid circulates through a void consisting of interior conduits inside the member 15 and is removed through conduit 62. Similarly conduit 63 admits cooling fluid to the interior of the lower cutting member 16, wherein it is circulated before removal through conduit 64. Thermally insulating sleeves 48 and 49 cover the outer surfaces of forward elements 28 and 29 and prevent cooling tissue unintentionally through contact with these members. Preferably a thermally insulated lining, of ceramic or any other suitable material, lines the walls of the specimen cavity to protect the specimen from the cold.

In yet another embodiment of the invention as shown in FIGURE 17 the cutting members are made of a porous metal or other material with a sharp edge and cooling fluid is forced into the cutting members 15 and 16 through conduits 61 and 63 respectively. The cooling fluid disperses through the porous material and is vented to the atmosphere on the outer surfaces. Protective thermally insulating sleeves 48 and 49 are also provided. Preferably a thermally insulating lining, of ceramic or other suitable material, lines the walls of the specimen cavity to protect the specimen from the cold.

In use the instrument of the invention provides a simple-to-use instrument which insures the removal of tissue specimens in good condition from any part of the body. It is particularly useful where access and/or vision are limited, as in parts of the various body cavities, such as the mouth and vagina. The instrument can also be used to remove specimens of bone marrow after the cortical bone or outer bone plate has been removed. Use of the instrument can be quickly mastered by a physician, dentist, veterinarian, or other qualified person, and does not require special skill or training. The lateral or side cutting edge on the front end of the cutting member permits easy access into tissue and with the single punching cut resulting from closing the instrument. There is minimal disturbance of tissue surrounding the specimen being removed. The cutting action of the instrument is greatly improved in the preferred embodiment by the slight sliding forward of the upper cutting member after the cutting members first closed. This sliding-cutting action insures that the specimen being removed is fully detached from the surrounding tissue. Proper alignment of the two opposing cutting members is aided by the preferred guide fin located just above on cutting member. By its shape it can be so formed as to aid, in cooperation with the opening shaped to receive it, in achieving the forward sliding-downward cutting action.

When preferably one of the elongated elements forming the instrument has a short somewhat flexible strut affixed above the hinge to cooperate with the opposing elongated element and serve as a fulcrum, better control of the cutting action is achieved. The fulcrum engages the opposing element when the instrument is barely closed and complete closing of the instrument is achieved by relatively heavy pressure in the closing motion, with the flexible fulcrum and the slight flexibility of the elongated members combining to permit the final cutting action. The fulcrum is not limited to the instrument described but can be applied to hinged or pivotal surgical instruments generally where fine control of the final closing action is desired.

While by no means essential to the instrument, the presence of opposing magnets in the two elongated elements, whether above the hinge as illustrated or below, greatly assists the operator in using the instrument, particularly when a large number of speciments are to be removed in succession. Ordinarily the magnets are positioned to attract one another and thus tend to close the instrument and to hold it closed. This magnetic attraction to hold the instrument closed is particularly useful in those embodiments where the application of heat or cold follows the cutting action and hence where the instrument must be held in the closed position in the surrounding tissue for a short period after the specimen is severed. In some circumstances it may be desired to have the magnets oppose one another so that the operator closes the instrument against a resisting force, thereby achieving more delicate control of the cutting action. This repelling action also serves as a safety factor to prevent premature closing of a heated or cooled instrument. This is readily provided by reversing the poles of one of the magnets. The use of the magnets is not limited to the instrument described and they may be affixed to any hinged or pivoted surgical instrument where fine control of the closing action is desired.

While the superior cutting action of the instrument of the invention provides the many advantages described above, as well as others which will be apparent from the description of the instrument itself, additional advantages are achieved when the instrument is equipped to cauterize the tissue surrounding the specimen being removed. This may be accomplished by equipping the instrument with current carrying means to cauterize the tissue surrounding the specimen as by heat or a desiccating and coagulating current. The current can, of course, be regulated to provide the particular degree of heat desired for the tissue being treated. The degree of heat required depends on the type of tissue. For example, the mucous membrane of the mouth requires less heat to cauterize it than do the skin or the muscles. While the instrument has been illustrated in this embodiment with solid metal cutting members connected to a current source, it is to be understood that the current can be distributed through the cutting members in any convenient and suitable manner. Thus a grid or network of fine wires can be included in the bodies of the cutting members or embedded in the outer walls thereof. The appropriate current to achieve heating and/or desiccation and coagulation is supplied by any appropriate power source with a control device, such as a rheostate to regulate the current to the desired quantity. The flow of current through the cutting members can be caused by a remote switch alone or by first closing a switch or switches to feed current to individual cutting members and then letting the members themselves close the electrical circuit when they meet as the instrument is closed and the cut achieved. Though not essential, the provision of a porcelain, plastic or other suitable insulating lining or the interior of the cutting members around the tissue cavity is preferred.

Cauterization can be achieved not only by an electric current but by extreme cold as well, and cold can also cause stasis. Thus in one embodiment of the invention instrument to very low temperatures by passing cooling fluid, liquid or gaseous, through the cutting members. The fluid, from any convenient source, is circulated through the cutting member under a positive pressure. Any fluid can be used which is cold enough to chill the cutting members sufficiently. The so-called "cryogenic fluids" are particularly suitable for some applications. These include liquid argon, liquid fluorine, liquid helium, liquid hydrogen, liquid neon, liquid nitrogen, liquid oxygen, and liquid methane. However, any otherwise suitable fluid, liquid or gaseous, which can be cooled below 0° C. can be employed. Liquids which in the gaseous state are explosive, such as hydrogen, oxygen and methane, must be handled with extra care and under conditions which minimize the danger of explosion.

If the fluid used is toxic or potentially toxic, such as fluorine or methane, the instrument must be designed to return the liquid after circulation for disposal and this may also be desirable with the potentially explosive materials. In any event, care must be taken that cold fluid is not released against tissue. When the gas form of the liquid is not toxic or explosive, or if explosive, proper precautions are taken, the liquid can be diffused through a porous cutting member and in warming up will become gaseous and escape from the instrument to the atmosphere as gas. The use of a cold or cryogenic fluid in an instrument to rapidly cool the instrument and cause stasis or cauterization of the remaining tissue bed or cavity is not limited to the instrument described herein but can be applied generally to surgical instruments where it is desired to affect tissue of the types described above, i.e., viable tissue which is sufficiently soft to be cut by a surgical cutting edge, with extreme cold, that is, to cause stasis or cauterization and sealing off an area of tissue or even destruction of the tissue as in the case of the removal of malignancies.

The degree of cold achieved on the surface of the instrument cutting members, and hence on the surface of the tissue they contact, will depend on a number of factors, including the particular cooling fluid chosen and its temperature, the rate at which the fluid is forced through the instrument, type and thickness of the metal used in the cutting members, the length of time the cutting members are in contact with the tissue, and the like. One skilled in the art can readily select the proper combination of particular cooling fluid, rate of circulation of the fluid through the instrument, etc., to give the temperature desired on the cutting members.

Thus the instrument can cause stasis in the tissue, that is, to a temperature low enough to inhibit activity and the movement of fluids in the tissue without damaging the tissue, thereby greatly lessening the danger of the spread of any malignancy present. Or the instrument can be cooled to temperatures low enough to "burn" or cauterize the tissue, thereby sealing off the tissue face and preventing the spread of any malignancy present.

The extremely low temperature of the instrument may cause it to tend to stick or freeze to tissue. This may be prevented by applying to the cooled portions of the instrument a thin coating of a lubricant or grease, such as petroleum jelly, or the like.

The degree of cold required to achieve stasis will vary with the type of tissue. With tissue such as the mucous membrane, a temperature of about 0° to —3° C. may be sufficient while tissue such as muscle may require —8° C. or lower, down to —14° C. Cauterization may occur at temperatures of about —15° C. in some types of tissue, while other types will require lower temperatures. In achieving stasis or cauterization the time the instrument is held against the tissue, that is, the time that heat is withdrawn from the tissue, is also quite important. This may vary from a few seconds or less to a minute or more, depending on the type of tissue, temperature of the instrument, and the degree of stasis or cauterization required.

In the construction of the instrument of the invention it will be appreciated that the construction of the handle and of the instrument is not critical and that the finger loops shown are merely one embodiment of the handles illustrated for convenience. The construction of the elongated members above the hinge or pivot point can be modified in any manner desired, including plier type handles or a pistol grip and trigger arrangement for example, without in any way exceeding the scope of the invention. It will also be appreciated that the reinforcing strut 22 while desirable for added strength is not essential. Other obvious modifications can be made, such as the inclusion of a light source mounted on the instrument.

What is claimed is:

1. A biopsy instrument comprising a pair of elongated mutually hinged members extending in a common plane and containing a hinge, an activating handle integral with each elongated member, inter-engaging cutting members integral with said elongated members and in upper and lower position relative to one another in use of the instrument, the upper cutting member having an upper cutting edge which is substantially vertical in the normal use position of the instrument and the lower cutting member having a forwardly projecting cutting edge which is substantially horizontal in the normal use position of the instrument, a magnet attached to each of said elongated members, at least one of said magnets being movable in the elongated member on which it is mounted so that it can be so positioned that the magnets either attract or repel one another.

2. A biopsy instrument comprising a pair of elongated mutually hinged members extending in a common plane and containing a hinge, an activating handle integral with each elongated member, inter-engaging cutting members integral with said elongated members and in upper and lower position relative to one another in use of the instrument, the upper cutting member having an upper cutting edge which is substantially vertical in the normal use position of the instrument and the lower cutting member having a forwardly projecting cutting edge which is substantially horizontal in the normal use position of the instrument, said upper cutting member having a raised portion on its surface above said upper cutting edge and said lower cutting member has a portion of its surface so shaped as to cooperate with said raised portion to cause said upper cutting member to move forward, then down, and then forward again as the instrument is closed.

3. A biopsy instrument as claimed in claim 2 in which said lower cutting member has, in addition to said forwardly projecting cutting edge, a lower cutting edge which is substantially vertical and which cooperates with said upper cutting edge of said upper cutting member.

4. A biopsy instrument as in claim 3 wherein said upper cutting edge of said cutting member and lower cutting edge of said lower cutting member are both circumferentially complete.

5. A biopsy instrument as in claim 3 wherein said upper cutting edge of said upper cutting member is interrupted by an opening at the rear and said lower cutting edge of said lower cutting member is interrupted by and integral with rear wall of said lower cutting member.

6. A biopsy instrument as in claim 3 wherein said upper cutting edge of said upper cutting member is circumferentially complete and said lower cutting edge of said lower cutting member is interrupted by a rear wall of said lower cutting member, there being a gap between the ends of said lower cutting edge and said wall to receive the rear portion of said upper cutting edge when the instrument is closed.

7. A biopsy instrument as in claim 3 wherein said lower cutting edge of said lower cutting member is interrupted by an integral with a rear wall of said lower cutting member and said upper cutting edge of said cutting member is circumferentially complete except for two notches positioned to receive each of the rear portions of said lower cutting edge when said instrument is closed.

8. A biopsy instrument as in claim 2 wherein the portion of the elongated member integral with and slightly above said lower cutting member has a fin projecting toward the portion of the elongated member integral with and just above said upper cutting member, which latter portion has an opening shaped to receive said fin, said fin and said opening cooperating to keep the two cutting members of the instrument aligned with one another when the instrument is closed.

9. A biopsy instrument as in claim 2 wherein at least one of said upper and lower cutting members has cooling means integral with it to cool the outer surfaces of said cutting member.

10. A biopsy instrument as in claim 9 wherein said upper cutting edge of said upper cutting member defines a cavity and the interior walls of said cavity and top surface of said lower cutting member are covered with a thermally insulating material.

11. A biopsy instrument as in claim 9 wherein the outer surfaces of the portions of each of said elongated members immediately above said cutting members is covered with a thermally insulating material.

12. A biopsy instrument as in claim 9 wherein said cooling means comprising at least one void inside said cutting member, said void being vented to the atmosphere at one opening into said void and connected to a fluid supply conduit at another opening into said void.

13. A biopsy instrument as in claim 9 wherein said cooling means comprises at least one void inside said cutting member, one opening into said void being connected to a fluid supply conduit and another opening into said void being connected to a fluid exhaust conduit.

14. A biopsy instrument as in claim 9 wherein said cooling means is a porous cutting member connected to a fluid supply conduit capable of introducing fluid into said cutting member.

15. A biopsy instrument as in claim 2 wherein at least one of said upper and lower cutting members has heating means integral with it to heat the outer surfaces of said cutting member.

16. A biopsy instrument as in claim 15 wherein said upper cutting edge of said upper cutting member defines a cavity and the interior walls of said cavity and top surface of said lower cutting member are covered with a thermally insulating material.

17. A biopsy instrument as in claim 15 wherein the outer surfaces of the portions of each of said elongated members immediately above said cutting member is covered with a thermally insulating material.

18. A biopsy instrument as in claim 15 wherein said heating means consists of electrical wires supplying electrical current to said cutting member.

19. A biopsy instrument as in claim 18 wherein said cutting member is electrically insulated from the balance of said elongated member.

20. In a surgical instrument comprising a pair of elongated mutually hinged members extending in a common plane and containing a hinge and an activating handle integral with each elongated member and inter-engaging cutting members integral with said elongated members, the improvement which comprises a magnet attached to each of said elongated members, at least one of said magnets being movable in said elongated member so that it may be so positioned that the magnets either attract or repel one another.

21. A surgical instrument comprising an instrument body, a tissue cutting surgical member of heat conducting material mounted on said body, said cutting member having a hollow therein with an inlet and an outlet therein spaced from each other and conduit members connected to said inlet and outlet in said cutting member and at least the conduit connected to said inlet adapted to be connected to a source of cryogenic fluid, said conduit members extending from the cutting member toward the source of cryogenic fluid along paths spaced from each other.

22. A surgical instrument comprising an instrument body, a tissue contacting surgical member of heat conducting material mounted on said body, said surgical member having an elongated hollow therein and extending substantially parallel to the contour of the member with an inlet and an outlet at opposite ends of the hollow and having no recesses branching therefrom and no restrictions therein, and conduit members connected to said inlet and outlet in said surgical member and at least the conduit connected to said inlet being a simple tubular member adapted to be connected directly to a source of cryogenic fluid, said conduit members extending from the surgical member toward the source of cryogenic fluid along separate paths having the axes spaced from each other, whereby the flow of cryogenic fluid through the conduit members and the elongated hollow is free and unrestricted and provides a maximum heat removal effect before it flows out of the hollow.

23. A method of simultaneously cutting and causing stasis in soft viable tissue, which comprises cutting the soft viable tissue with surgical cutting means having a cutting member of heat conducting material having a hollow therein, and at the same time rapidly cooling the soft viable tissue being cut to a temperature of from about 0° C. to −14° C. by passing a cryogenic fluid through the hollow in said cutting means.

24. A method of simultaneously cutting and causing cauterization in soft viable tissue, which comprises cutting the soft viable tissue with surgical cutting means having a cutting member of heat conducting material having a hollow therein, and at the same time rapidly cooling the soft viable tissue being cut to a temperature below about −15° C. by passing a cryogenic fluid through the hollow in said cutting means.

25. A method of causing stasis or reversible freezing of viable tissue without causing an attendant tissue damage, comprising the steps of applying a surgical instrument to the tissue and rapidly cooling the contacted tissue to a temperature between 0° C. and −14° C. in a time of from a few seconds to about 1 minute by cooling the tissue contacting part of the instrument.

26. A method of causing cauterization or destrcution of viable tissue, comprising applying a surgical instrument to the tissue and rapidly cooling the tissue contacted thereby to a temperature below −15° C. in a time of from a few seconds to about 1 minute by cooling the tissue contacting part of the instrument.

References Cited
UNITED STATES PATENTS

| | | | |
|---|---|---|---|
| 2,590,725 | 3/1952 | Sanger | 83—171 XR |
| 2,645,097 | 7/1953 | Posch. | |
| 2,982,112 | 5/1961 | Keyes | 62—293 |
| 2,994,321 | 8/1961 | Tischler | 128—2 |
| 3,001,522 | 9/1961 | Silverman | 128—2 |

OTHER REFERENCES

Rowbotham et al., "The Lancet" pp. 12–15, Jan. 3, 1959, 128–401.

RICHARD A. GAUDET, *Primary Examiner.*

WILLIAM E. KAMM, *Examiner.*